US008719185B2

(12) United States Patent
Carey et al.

(10) Patent No.: US 8,719,185 B2
(45) Date of Patent: May 6, 2014

(54) METHOD AND SYSTEM FOR TRACKING AND BUDGETING ENERGY USAGE

(75) Inventors: Margaret M. Carey, Waccabuc, NY (US); Douglas L. Pfeister, New York, NY (US); Christopher Putnam, Montclair, NJ (US)

(73) Assignee: MC Energy, Inc., New York, NY (US)

( * ) Notice: Subject to any disclaimer, the term of this patent is extended or adjusted under 35 U.S.C. 154(b) by 57 days.

(21) Appl. No.: 12/892,731

(22) Filed: Sep. 28, 2010

(65) Prior Publication Data

US 2011/0161251 A1 Jun. 30, 2011

Related U.S. Application Data

(62) Division of application No. 11/335,914, filed on Jan. 18, 2006, now Pat. No. 7,818,270.

(60) Provisional application No. 60/645,473, filed on Jan. 18, 2005.

(51) Int. Cl.
*G01R 11/56* (2006.01)
*G06F 17/00* (2006.01)
*G06Q 50/06* (2012.01)

(52) U.S. Cl.
CPC .................................. *G06Q 50/06* (2013.01)
USPC ........................................................ 705/412

(58) Field of Classification Search
CPC ...................................................... G06Q 50/06
USPC ........................................................ 705/412
See application file for complete search history.

(56) References Cited

U.S. PATENT DOCUMENTS

| 5,930,773 | A  | 7/1999  | Crooks et al. |
|-----------|----|---------|---------------|
| 6,088,688 | A  | 7/2000  | Crooks et al. |
| 6,178,362 | B1 | 1/2001  | Woolard et al.|
| 6,553,418 | B1 | 4/2003  | Collins et al.|
| 6,577,962 | B1 | 6/2003  | Afshari       |
| 6,618,709 | B1 | 9/2003  | Sneeringer    |
| 6,636,893 | B1 | 10/2003 | Fong          |
| 6,701,298 | B1 | 3/2004  | Jutsen        |
| 6,785,592 | B1 | 8/2004  | Smith et al.  |

(Continued)

FOREIGN PATENT DOCUMENTS

CA          2515159         8/2004

OTHER PUBLICATIONS

Action dated Mar. 22, 2013, from the Canadian Intellectual Property Office.

*Primary Examiner* — Allen J Jung
(74) *Attorney, Agent, or Firm* — Vinson & Elkins LLP

(57) ABSTRACT

An energy tracking and reporting system can receive data inputs from multiple sources regarding one or more properties. A central database receives the information and correlates the information for numerous outputs. Information received by the central database can include, for example, property location, property size, property type and property use. Also, occupancy information, energy sources, utilities servicing the property, weather, ISO, environmental guidelines, and the traded or other standard price for the utilities can be stored. The system can calculate a number of factors from the data and return values to the central database. The system can track data trends and store additional information for budgeting, user reporting and certification compliance reporting. Modules can analyze the market rates, calculate efficiency benchmarks, analyze the data stored on the central database and provide the user with multiple tables and charts analyzing all of the factors that tie into energy usage.

15 Claims, 9 Drawing Sheets

(56) References Cited

U.S. PATENT DOCUMENTS

| | | |
|---|---|---|
| 7,069,161 B2 | 6/2006 | Gristina et al. |
| 2002/0198629 A1 | 12/2002 | Ellis |
| 2003/0004660 A1 | 1/2003 | Hunter |
| 2003/0009401 A1 | 1/2003 | Ellis |
| 2003/0014342 A1 | 1/2003 | Vande Pol |
| 2003/0055677 A1* | 3/2003 | Brown et al. .................... 705/1 |
| 2003/0061091 A1 | 3/2003 | Amaratunga et al. |
| 2003/0176952 A1 | 9/2003 | Collins et al. |
| 2004/0024717 A1 | 2/2004 | Sneeringer |
| 2004/0064328 A1 | 4/2004 | Keranen |
| 2004/0249515 A1 | 12/2004 | Johnson et al. |

* cited by examiner

|  | kWh | | kW | | TOTAL COST | | SUPPLY CONTRACT GAINS* | |
|---|---|---|---|---|---|---|---|---|
| NOV-2003<br>-2002 | 1,545,500<br>1,569,600 | -2% | 2,968<br>2,850 | 4% | $184,092<br>$179,773 | 2% | $22,823<br>$9,807 | 133% |
| DEC-2003<br>-2002 | 1,442,400<br>1,442,400 | 0% | 2,830<br>2,838 | 0% | $177,323<br>$166,768 | 6% | $12,293<br>$18,342 | -33% |
| JAN-2004<br>-2003 | 1,574,400<br>1,653,600 | -5% | 2,756<br>2,756 | 0% | $189,907<br>$183,400 | 4% | $13,547<br>$22,632 | -40% |
| FEB-2004<br>-2003 | 1,464,000<br>1,495,200 | -2% | 2,788<br>2,778 | 0% | $174,967<br>$171,211 | 2% | $74,715<br>$83,470 | 10% |
| MAR-2004<br>-2003 | 1,490,400<br>1,372,800 | 8% | 2,864<br>2,902 | -1% | $183,071<br>$162,820 | 12% | $-1,351<br>$55,242 | -102% |
| APR-2004<br>-2003 | 1,428,000<br>1,478,400 | -3% | 2,890<br>3,060 | -6% | $180,430<br>$168,292 | 7% | $8,228<br>$77,725 | -89% |
| MAY-2004<br>-2003 | 1,531,200<br>1,404,000 | 8% | 3,278<br>2,972 | 10% | $194,923<br>$165,857 | 18% | $53,633<br>$46,175 | 16% |
| JUN-2004<br>-2003 | 1,447,200<br>1,440,000 | .5% | 3,176<br>2,966 | 7% | $202,802<br>$192,702 | 8% | $159,180<br>$52,404 | 204% |
| JUL-2004<br>-2003 | 1,644,000<br>1,579,200 | 4% | 3,210<br>3,166 | 1% | $55,438<br>$218,754 | -75% | $-55,438<br>$106,129 | -152% |
| AUG-2004<br>-2003 | 0<br>1,440,000 | -100% | 0<br>2,166 | -100% | $0<br>$201,976 | -100% | $0<br>$86,188 | -100% |
| TO DATE: | 13,567,200<br>14,875,200 | -9% | 3,278<br>3,166 | 4% | $1,552,952<br>$1,812,551 | -14% | $287,620<br>$508,114 | -43% |

METHOD AND SYSTEM FOR TRACKING AND BUDGETING ENERGY USAGE

RELATED APPLICATIONS

This application is a divisional application of U.S. application Ser. No. 11/335,914, filed Jan. 18, 2005, which claims the benefit of U.S. Provisional Application Ser. No. 60/645,473, filed on Jan. 18, 2005, the disclosures of which are incorporated herein by reference in their entirety.

BACKGROUND OF THE INVENTION

1. Field of the Invention

The invention relates to a method a system to track, analyze and report on the cost and efficiency of energy usage of one or more properties.

2. Discussion of Related Art

Energy usage is a significant fixed cost for most properties, commercial, industrial and residential. Increasing the energy efficiency of a property can result in cost savings. In addition to increasing efficiency, the deregulation of the energy market allows an owner to choose one or more energy suppliers, each with different sources and rates. The combination of maximizing efficiency and negotiable energy rates places more emphasis on the property owner to monitor energy usage to aid in the selection of an energy supplier and control or reduce costs.

In addition to the financial aspect of energy efficiency, energy conservation is of public concern and can be a public relations point. To this end, the International Organization for Standardization (ISO) has devised the 14000 family of standards which are primarily concerned with "environmental management." ISO 14000 tracks what an owner does to minimize harmful effects on the environment caused by the owner's activities, and the owner's continual improvement of environmental performance. ISO 14000 is known as a "generic management system standards" and can be applied to any organization, large or small, whatever its product or service, and whether it is a business enterprise, a public administration, or a government department. ISO 14000 certification requires detailed tracking and a typical owner has to track their compliance through mostly manual means which is burdensome and time consuming.

Thus, there is a need in the art for a method and system to track, analyze and report on energy usage, costs, environmental goals, efficiency indicators, utility rates and savings. Additionally, there is a need to simplify and partially automate the reporting of compliance goals set by standards groups.

SUMMARY OF THE INVENTION

An energy tracking and reporting system having a central database is designed to receive data inputs from multiple sources typically located remote from one or more properties. The central database receives information regarding the property from numerous sources and correlates the information for numerous outputs.

Information received by the central database can include fixed information, for example, property location, property size (typically in square feet), property type and property use. Also, long term property occupancy information can be collected regarding the occupancy of property. For example, information regarding whether property is occupied by the owner or if the property is occupied by one or more tenants.

The central database also stores the types of energy sources that heat, cool and electrify the property. Heating information can have the type of heating system, i.e., oil, natural gas, forced air or steam, and the square footage covered by the heating system. Cooling information can include the type, i.e. electric, natural gas, steam, package units and auxiliary units. The cooling information can also include a percentage of usage of the energy for the cooling system.

Information regarding the property's heating, ventilation, and thermostat system can be stored. The particular setting and actual temperature read from the thermostat and heating and cooling air flow can be tracked as well as identifying the actual temperature of the floor or section of the property and the settings made by the occupants.

The central database can also store information regarding the utilities servicing the property since, under the current deregulated market, the property can have multiple energy providers. A Local Distribution Company ("LDC") is responsible for the transmission and distribution of the energy and the upkeep of the transmission network. LDC data can include the rates charged for the transmission and maintenance and can also include the different accounts and rate models both subscribed to by the owner/tenant and the alternate models available but not currently subscribed to. Further, the type of utility that services a majority of the area surrounding the property (typically the LDC) is also noted.

A supplier can just supply one or more types of energy to be transmitted over the LDC's transmission network to the property. Supplier typically has a supply contract with owner containing contract terms for quantity and price and any pollution credits. The pricing is usually tied to a load factor, levels of consumption, and peak load.

Third party information is also downloaded to central database. Third party information includes weather, ISO or other environmental guidelines, and the traded or other standard price for the utilities. Weather station data, both contemporaneous and historical, can be downloaded and stored on the central database.

ISO 14000 specifications have set energy consumption and conservation parameters to meet and reporting guidelines to follow. Guideline data can contain information for the specific factors to be tracked and the reporting requirements. Further, market or industry data can be inputted to track the cost of the energy or the commodity used to generate the energy. For example, the cost of natural gas, heating oil, crude oil, and coal can be tracked and/or trended to determine current and future market prices. Further, data for determining pollution reduction factors, for example, $CO_2$, $NO_x$, and $SO_2$ reduction tables, the number of equivalent trees planted and miles not driven by car pooling employees, can be inputted.

Monthly billing data can also be retrieved from the LDC and/or supplier and stored on the central database. Information including the start and end dates of the billing cycle for the property and the LDC's calculation of total Heating Degree Days (HDD) and/or Cooling Degree Days (CDD) for the billing period. Consumption and costs are also stored, including actual metered consumption, actual metered peak demand, supply costs and transmission and distribution costs.

The system can calculate a number of factors from the data and return values to the central database. Calculated values can include occupancy per kilowatt hour, dollar of cost per kilowatt hour ($/kWh), dollar of cost per square foot of the property ($/ft$^2$), watts per square foot of the property (W/ft$^2$), BTUs per square foot of the property (BTU/ft$^2$), and kilowatt hour per square foot of the property (kWh/ft$^2$). Other calculated values are energy usage per CDD and HDD, energy usage per occupant, consumption per square foot of property based on supply contract terms, and cost adjustments based on market prices. Another value that is calculated is a heating factor and a cooling factor. The heating/cooling factor describes the average increase in energy consumption for each additional degree day. All the calculated values can be determined for various tenants or the property as a whole. Further, calculations can be performed for various time periods, including, for example, every 15 minutes, hourly, weekly, monthly, billing period, seasonally, quarterly and yearly. Increases and decreases in values can be tracked and stored as percent changes in values.

The system can track data trends and store additional information for budgeting and both user reporting and certification compliance reporting. A green energy/ISO compliance module retrieves data from central database to track green energy purchases by sources of the energy and energy allocations. Both the "green" energy prices and conventional "brown" energy prices are tracked and compared. Some comparisons can be made between the green power and open market prices for brown power (i.e., coal and oil plants) and/or the reduced prices for joining a power pool.

Green energy/ISO compliance module can also calculate a pollution reduction value based partly on the amount of green power purchased and the type of energy normally powering the property. Further, the green energy/ISO compliance module can track energy conservation goals and be used to report compliance with ISO or EPA standards. Alerts can be set to be transmitted from an alert module to notify the user of non-compliant events or non-compliant properties. Additionally, green energy/ISO compliance module can analyze the brown and green power usage and notify user of the opportunities and benefits of green power.

An environmental footprint module can monitor and report on property's environmental impact (a.k.a., "footprint"). The impact is the greenhouse gas emissions and any other pollutants directly attributable to the operation and use of facilities on the property. The environmental footprint module and/or central database can store and track historical pollution levels in conjunction with historical energy usage. Emissions levels can be equated to number of miles driven and to the number of trees removed from earth or any other standard set by the regulating agency. The environmental footprint module can benchmark emissions levels against local/regional/national "baselines" to determine whether or not the facility is exceeding local (or any other regulating body's) emissions standards and can perform pollution and greenhouse gas emissions reduction reporting.

The environmental footprint module can run simulations, noting the costs of compliance, to lower pollution below compliance, and the benefits in the sale of pollution credits. Further, the environmental footprint module can quantify the performance (i.e., pollution/emissions reductions) of various facilities, on the same property or within an owner's portfolio, relative to the specific emissions levels or pollution reductions set forth within a corporate strategy. Also, the environmental footprint module can track Emissions Credit Trading to allow the user to define a carbon allowance (user defines interval level—from hour to year) and can track carbon dioxide emissions relative to the allowance and the market for the credits.

Occupancy module tracks the number of occupants at the property and compares the occupancy data to both the demand and consumption data. The occupancy module can track and notify user of peaks in energy consumption correlated to specific occupancy of the property. Further, the occupancy module can track the occupancy of particular tenants and the energy consumption of tenant. Additional, peak occupancy, resulting in a spike in energy usage can be tracked and automatically assigned to the tenant. Also, an occupancy per energy curve can be normalized by square footage and can be used as a value to compare properties to each other as a measure of efficiency.

A rate tracking module can analyze the market rates for the LDC, supplier and other energy providers. Other providers include other green and brown providers as well as power generated internally by the property. The rate tracking module can re-calculate the rate calculation performed by LDC for each account class which can be used to compare the market rate to supply rates. Further, the market rates can be used to calculate a cost savings between the market rate and the lower supply rates. The rate tracking module can compare a supplier's rate against the rates of comparable competing suppliers to determine if supplier is competitive or a change of suppliers is warranted. Further rate tracking can determine if the energy consumption of the property is outside the maximum consumption dictated in a supply contract between owner and the LDC/supplier. An alert can be generated by alert module notifying user to review the contract and possibly renegotiate the terms of the contract.

The energy tracking and reporting system can also include an efficiency module to calculate efficiency benchmarks. Efficiency benchmarks can be calculated by normalizing consumption to the square footage, occupancy or other property metrics. The normalizing allows one property's energy use to be compared with another property's energy use. Each property can have benchmarks calculated and used for comparison. Examples of efficiency benchmark comparisons are comparing property efficiency against a user-defined portfolio.

The efficiency module can also track property efficiency over time. Property efficiency metrics can be compared for different time periods in a range (i.e., 15 minutes, hourly, daily, weekly, monthly, billing period, seasonally, quarterly, or yearly). Efficiency benchmarks can be compared to changes in one or more of consumption, occupancy, and temperature.

The budget module can analyze the data stored on the central database and provide the user with multiple tables and charts analyzing all of the factors that tie into energy usage for the property. Budget module can perform many different analyses of current and historical data to estimate future energy usage and costs.

A method of determining a budget, based on historical data includes calculating future energy consumption. A user selects a time period over which historical energy consumption data is used. The historical energy consumption for the entire historical period is calculated and the user is given the option to modify the historical consumption. If the user elects to modify the historical consumption, the data can be modified by a user defined factor or an alternate factor. If the user defines a factor, the historical consumption is modified by the factor to calculate future energy consumption. Alternately, the user can select other, calculated factors, including, for example, occupancy, efficiency or weather.

Another embodiment of the invention is a method to calculate a future cost basis to apply to the future consumption. The user selects a budget time period over which the rates should be forecast and selects if supplier is supplying the energy or if LDC is handling both transportation and delivery and energy supply. If LDC is handling both the transportation and supply, a rolling average cost for the energy is calculated for each month, billing period, or any other time period of interest. The rolling average can be calculated over a pre-defined period, for example, 3 years, or the user can select the rolling average period. The rolling average method of calculation does not separate the transportation and distribution costs from the energy costs. The user can optionally add a cost modifier to indicate an estimated increase or decrease in the cost of the energy. If the modifier is not added, the rolling average becomes the future cost. Alternately, if a modifier is input, the rolling average is modified accordingly and the future cost per unit energy is calculated.

If the supplier is handling the energy supply and LDC is handling only the transportation and delivery, a rolling average is calculated using only the LDC charges. As above, the rolling average can be calculated over a predefined period, for example, 3 years, or a user selected rolling average period. The supply costs are contracted for and the contract value is stored. The contract supply cost is retrieved and is added to the rolling average to calculate future costs. The calculated cost is input into the model and multiplied by future consumption for the time period and the total future budget is calculated.

Additional modifiers can be used for calculating the future costs. For LDC transportation and distribution costs and LDC supply costs, rate tariffs are published, typically six months in advance and some up to twelve months in advance. If there is a period of time in the selected budget period where published rates are not available, the rolling average can be trended and modified accordingly.

The above calculations can be performed for any energy source over any time period. If historical data for a property is limited or not available (i.e., new construction), historical data from other properties can be used to fill on missing information or be used as a "best guess". The properties selected can be similar in location, use, occupancy, or any other factors the user chooses.

BRIEF DESCRIPTION OF THE DRAWING FIGURES

The above and still further objects, features and advantages of the present invention will become apparent upon consideration of the following detailed description of a specific embodiment thereof, especially when taken in conjunction with the accompanying drawings wherein like reference numerals in the various figures are utilized to designate like components, and wherein:

FIGS. 6a, 6b and 6c are a property overview chart of the present invention; and

DETAILED DESCRIPTION OF THE INVENTION

Figure 1:
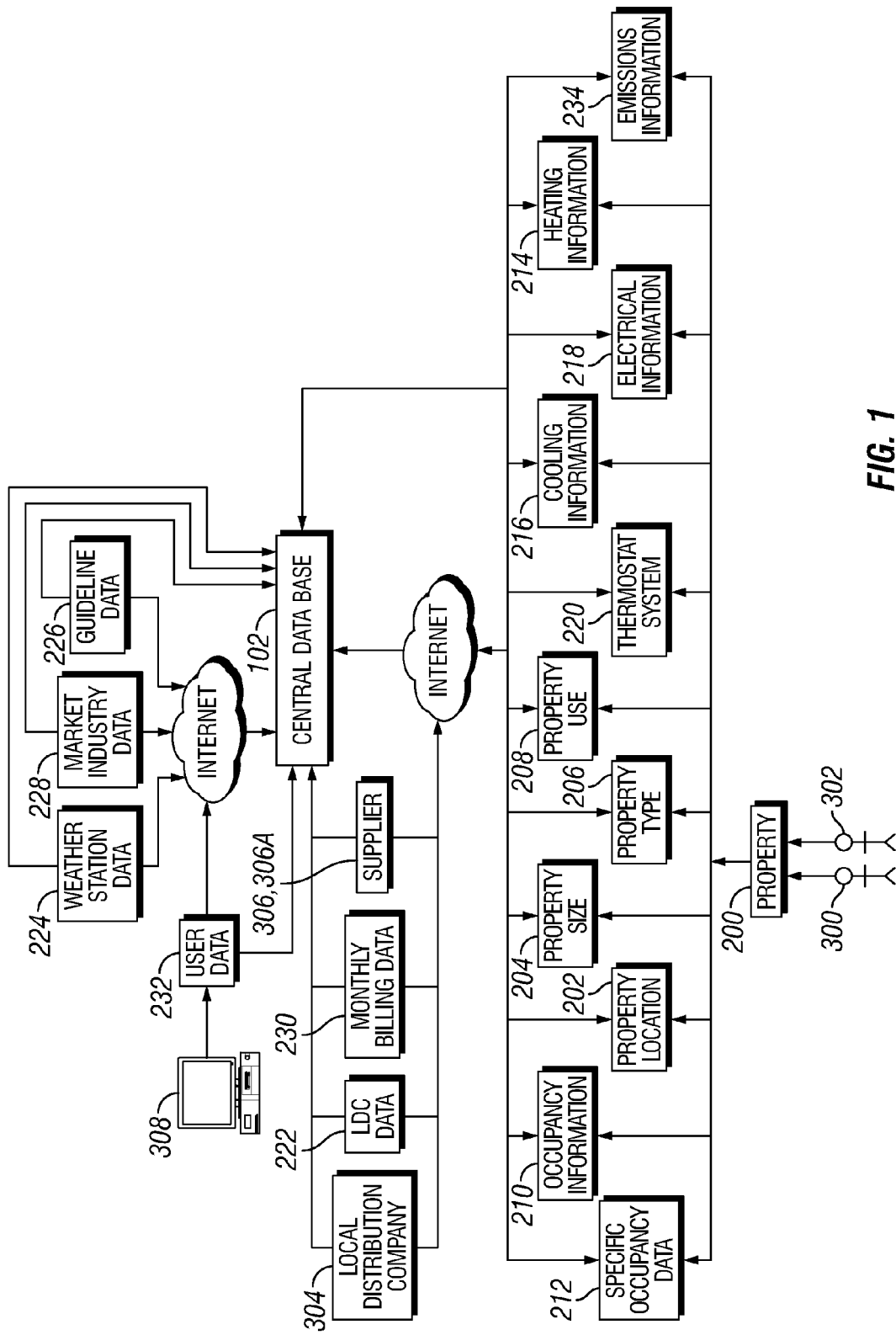
FIG. 1 is an illustration of the networked system of the present invention.

FIG. 1 illustrates an energy tracking and reporting system 100 according to the present invention. A central database 102 is designed to receive data inputs from multiple sources Central database 102 is typically located remote from one or more properties 200 and can be located on a single server or distributed over a network of remote servers. Central database 102 receives information regarding property 200 from numerous sources and correlates the information for numerous outputs.

Information received by the central database 102 can include fixed information, for example, property location 202, property size 204 (typically in square feet), property type 206 and property use 208. Property type 206 can be gathered from owner 300 or from local zoning ordinances. Since specific zoning requirements vary from municipality to municipality, a generic identification system can be used to normalize all the zoning laws into specific categories. Property type 206 can be designated as, for example, residential, commercial, light industrial and heavy industrial. Property use 208 is somewhat defined by the zoned property type. For example, property zoned residential typically cannot be converted into shopping center and used for commercial purposes. Property use 208 can include residential, rental residential, general office, and data center. Users can also be defined in broad categories to normalize the different types of property uses. In addition to broad categories for property type and usage, subcategories can also be used to provide additional details and groupings.

Long term property occupancy information 210 can be collected regarding the occupancy of property 200. For example, information regarding whether property 200 is occupied by owner 300 or if property 200 is occupied by one or more tenants 302. If the property is occupied by multiple tenants 302, the property use 208 data can be modified to take each tenant's use into account. The energy tracking system 100 can track individual tenants 302 and/or the building as a whole. Each individual tenant 302 has specific energy requirements and property 200 has common areas that are the responsibility of owner 300.

Specific occupancy data 212 can also be collected at regular intervals. Occupancy data 212 can be tracked over multiple intervals throughout the day (e.g., every 15 minutes or hourly) by providing information from property's 200 security system. Further, occupancy data 212 can be tracked by electrical or network usage. For example, if a person on property 200 logs into a computer network or powers on the light in an office, an "occupant" can be reflected in the occupancy data 212. Specific occupancy data 212 can be transmitted to the central database 102 via a network (e.g., WAN, LAN, etc.) or inputted manually.

In separate embodiments, the identity of a particular occupant may or may not be known. Either a "head count" of the occupants in property 200 is taken at a particular time and date or the system is aware of the identity of the particular occupants and/or their work location, office or station. Alternately, a percentage of total occupancy can be calculated.

Central database 102 also stores the types of energy sources that heat, cool and electrify property 200. Heating information 214 can have the type of heating system, i.e., oil, natural gas, forced air or steam, and the square footage covered by the heating system. Cooling information 216 can include the type, i.e. electric, natural gas, steam, package units and auxiliary units. Cooling information 216 can also include a percentage of usage of the energy for the cooling system. For example, if the cooling system is electrically powered, cooling information 216 can contain the percentage of electricity used to run the cooling system separated out from the entire load drawn by property 200.

Electric information 218 can be a percentage of the public or non-tenant energy consumption (e.g., lobby lights, air conditioning, escalators and elevators). The type of electricity redistribution, for example, rent inclusion, direct metering, submetering, or operations escalation (where the proportional share of the property's energy expenses are compared to a periodically determined base to determine costs) can also be stored. If property 200 is submetered, each tenant 302 can be analyzed by the methods and systems described below and/or the entire property 200 can be analyzed in more detail by focusing on each tenant 302. Additional information can include lease terms for tenant 302 utility consumption.

Information regarding property's 200 heating, ventilation, and thermostat system 220 can be stored. The particular setting and actual temperature read from the thermostat and heating and cooling air flow can be tracked. System 100 can identify the actual temperature of the floor or section of the property and the settings made by the occupants. This can help determine if certain sections of property 200 are exceptionally hot or cold or if the occupants are setting the thermostat outside a preset temperature rage for the particular time of year. Additional temperature sensors can be located in property 200 to provide greater detail.

Information regarding the utilities servicing property 200 is also stored in central database 102. Under the current deregulated market, property 200 can have multiple energy providers. A Local Distribution Company ("LDC") 304 is responsible for the transmission and distribution of the energy and the upkeep of the transmission network. LDC data 222 can include the rates charged for the transmission and maintenance and can also include the different accounts and rate models both subscribed to by the owner/tenant 300/302 and the alternate models available but not currently subscribed to. Further, the type of utility that services a majority of the area surrounding property 200 (typically the LDC) is also noted.

A supplier 306 can just supply one or more types of energy to be transmitted over the LDC's 304 transmission network to property 200. Supplier 306 typically has a supply contract with owner 300 containing contract terms for quantity and price. The pricing is usually tied to a load factor, levels of consumption, and peak load. A load factor corresponds to the ratio between an actual energy consumption (e.g., in kWh) and the maximum power demand for the same period of time.

Additionally, supplier 306 can be a Green Power supplier 306a. Green power suppliers 306a provide energy from a "green source" (e.g., wind, solar, methane or hydropower) or have certain energy allocation levels, price points, pollution reduction levels and the proper Green-e or ERT certification. Note that owner 300 can deal with the supplier 306 directly or as part of a buying group through an aggregator.

Third party information can also be downloaded to central database 102. Third party information includes weather, ISO or other environmental guidelines, and the traded or other standard price for the utilities and pollution credits.

Weather station data 224, both contemporaneous and historical, can be stored on central database 102. A common weather variable utilized for weather derivatives, energy trading, weather risk management and seasonal planning are "degree days", for both heating and cooling. Degree days are a method for determining cumulative temperatures over the course of a season. Degree days are based on how far the average temperature departs from a human comfort level of 65° F. Simply put, each degree of temperature above 65° F. is counted as one cooling degree day, and each degree of temperature below 65° F. is counted as one heating degree day. For example, a day with an average temperature of 80° F. will have 15 cooling degree days. Note that in very warm or cold locations, an alternative base, such as 55° F. or 75° F., can be used The number of degree days accumulated in a day is proportional to the amount of heating/cooling property 200 must perform to reach the human comfort level of 65° F. Degree days are accumulated each day over the course of a heating/cooling season, and can be compared to a long term (multi-year) average, or normal, to see if that season was warmer or cooler than usual.

A Cooling Degree Day (CDD) is computed by subtracting a base temperature of 65° F. from the average temperature (usually rounded to the nearest degree) for the day. A Heating Degree Day (HDD) is computed by subtracting the average temperature (usually rounded to the nearest degree) for the day from the base temperature of 65° F.

Degree days are officially observed by the National Weather Service (NWS) and officially archived by the National Climatic Data Center (NCDC). The NWS rounds average (mean) daily temperatures to the nearest whole number and thus official degree day records contain only integer totals. However, the Energy and Re/Insurance Industries typically do not round daily average temperatures and thus fractional degree day values are documented (i.e., 0.0, 0.5). Daily degree days data can be alternately by provided by systems installed in property 200. For ease of calculation, one embodiment retrieves degree days information from the NWS.

ISO 14000 specifications have set energy consumption and conservation parameters to meet and reporting guidelines to follow. Guideline data 226 can contain information for the specific factors to be tracked and the reporting requirements.

Further, market or industry data 228 can be inputted to track the cost of the energy or the commodity used to generate the energy. For example, the cost of natural gas, heating oil, crude oil, and coal can be tracked and/or trended to determine current and future market prices. Further, data for determining pollution reduction factors, for example, $CO_2$, $NO_x$, and $SO_2$ reduction tables, the number of equivalent trees planted and miles not driven by car pooling employees, is inputted.

Market/Industry data 228 can also include tracking pollution credits. Currently, there is a marketplace for "air pollution credits." A facility is allotted, by permit, certain amounts of waste it is allowed to discharge into the air. If the facility comes under the guidelines, they can sell the "extra discharge" to a facility that might not be in compliance with its air discharge permit. Regional markets have opened to trade the credits.

Monthly billing data 230 can also be retrieved from LDC 304 and/or supplier 306 and stored on central database 102. Information including the start and end dates of the billing cycle for property 200 and the LDC's calculation of total HDD and/or CDD for the billing period. Consumption and costs are also stored, including actual metered consumption, actual metered peak demand, supply costs and transmission and distribution costs. Further, energy rates can be tracked from LDC 304 or other energy suppliers that can service property 200.

User data 232, related to a user 308 of the system can also be stored. User data 232 can consist of general user information, i.e. name, address, password, and a listing of properties 200 user 308 can access. User 308 can also create portfolios of properties which are subsets of all the properties user 308 can access. The portfolios can be created to group, for example, all properties within a set location, having a specific type, use, or occupancy.

Emissions data 234 can be received from the property 200 or one or more facilities located on the property 200. Emissions data 234 can be the levels of greenhouse gasses and regulated gasses and wastes. The emissions data 234 can be directly measured or inferred from the amount of energy used, hours of operation, or the amount of other by-products. In an embodiment, greenhouse gas emissions (related to energy usage) can be determined by equating the facility's actual energy usage and the emission associated with the type of energy, the quantity of energy usage, and the particular location of the facility/property. Greenhouse gases can be measured in pounds (tons) and include three principle gases: carbon dioxide ($CO_2$), nitrous oxide ($N_2O$), and methane ($CH_4$). Additional gasses include: hydroflurocarbons (HFC's), perfluorocarbons (PFC's), and sulfur hexafluoride ($SF_6$). The six gases above are most heavily regulated by Governments, non-government organizations (NGOs), and treaties (Kyoto Protocol, etc.) but the system 100 of the present invention can track any pollutant, in any phase (solid, liquid, or gas).

Figure 2:
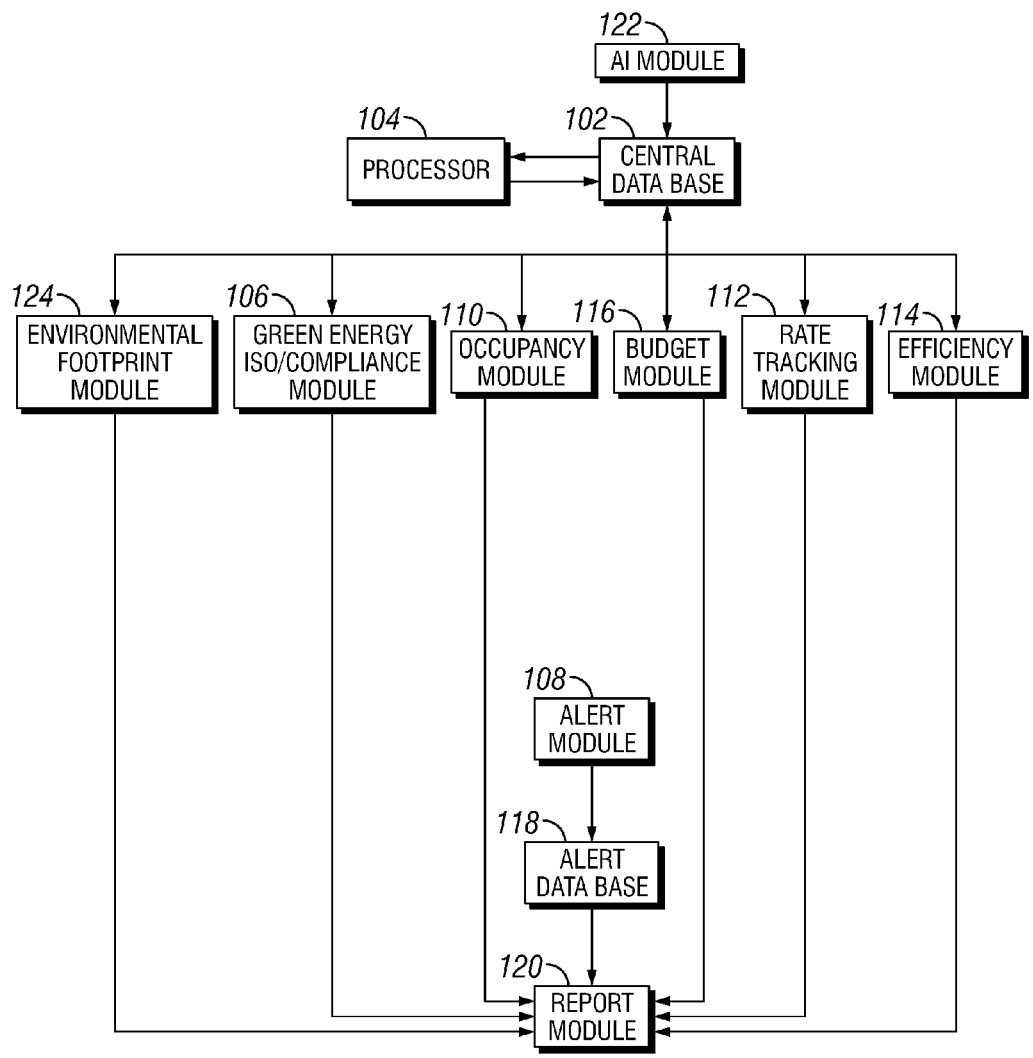
FIG. 2 is an illustration of the system of the present invention.

As illustrated in FIG. 2, once central database 102 has all the information required for the steps outlined below, a processor 104 calculates a number of factors from the data and returns the values to central database 102. Calculated values can include occupancy per kilowatt hour, dollar of cost per kilowatt hour ($/kWh), dollar of cost per square foot of property 200 ($/ft$^2$), watts per square foot of property 200 (W/ft$^2$), BTUs per square foot of property 200 (BTU/ft$^2$), and kilowatt hour per square foot of property 200 (kWh/ft$^2$). Other calculated values are energy usage per CDD and HDD, energy usage per occupant, consumption per square foot of property based on supply contract terms, and cost adjustments based on market prices. Another value that is calculated is a heating factor and a cooling factor. The heating/cooling factor describes the average increase in energy consumption for each additional degree day. All the calculated values can be determined for various tenants 302 or property 200. Further, calculations can be performed for various time periods, including, for example, every 15 minutes, hourly, weekly, monthly, billing period, seasonally, quarterly and yearly. Increases and decreases in values can be tracked and stored as percent changes in values.

The system 100 can track data trends and store additional information for budgeting and both user 308 reporting and certification compliance reporting. FIG. 2 further illustrates the associated modules 106-116, and 124, in communication with the central database 102 to track and report different elements of energy usage for property 200.

A green energy/ISO compliance module 106 retrieves data from central database 102 to track green energy purchases by sources of the energy and energy allocations. Both the "green" energy prices and conventional "brown" energy prices are tracked and compared. Some comparisons are made between the green power and open market prices for brown power (i.e., coal and oil plants) and/or the reduced prices for joining a power pool. A power pool is akin to a buying group of individual properties negotiating power contracts as a single entity to achieve reduced prices due to volume discounts.

Green energy/ISO compliance module 106 can also calculate a pollution reduction value based partly on the amount of green power purchased and the type of energy normally powering property 200. As an example, if the LDC is clean nuclear power, the pollution reduction value for property 200 is less than the same exact green power purchase if property 200 is in an area powered by dirty coal. Additional pollution reductions can be calculated from, for example, $CO_2$, $NO_x$, and $SO_2$ reductions from equivalent trees planted and miles not driven by car pooling employees.

Further, green energy/ISO compliance module 106 can track energy conservation goals and be used to report compliance with ISO or EPA standards. Alerts can be set to be transmitted from alert module 108 (discussed in detail below) to notify the user 308 of non-compliant events or non-compliant properties 200. Additionally, module 106 can analyze the brown and green power usage and notify user 308 of the opportunities and benefits of green power.

In an embodiment, an environmental footprint module 124 can monitor and report on property's environmental impact. Property 200 environmental impact (a.k.a., "footprint") is the greenhouse gas emissions and any other pollutants directly attributable to the operation and use of facilities on property 200. Environmental footprint module 124 can quantify the property's greenhouse gas emissions and other pollutants emitted during the operation of one or more facilities on the property 200. Some or all of the information used in this module can be taken from the emissions data 234.

User 308 can define a time period to view pollution levels (hourly, daily, weekly, monthly, and annually). Environmental footprint module 124 and/or central database 102 can store and track historical pollution levels in conjunction with historical energy usage. Emissions levels can be equated to number of miles driven and to the number of trees removed from earth or any other standard set by a regulating agency.

The energy usage levels can be stored by time period (daily, monthly, yearly) in central database 102 for each facility on a property or by property 200. Greenhouse gas emissions (related to energy usage) can also be stored in the central database 102 and can be stored by location, fuel source/mix, utility, and supplier. In an embodiment, they are stored by "X" amount of power equals "Y" pounds of emissions gas (i.e. $CO_2$, $N_2O$, etc.) (e.g., 100 kWh=1 ton of $CO_2$).

Environmental footprint module 124 can benchmark emissions levels against local/regional/national "baselines" to determine whether or not the facility/property is exceeding emissions standards. Further, environmental footprint module 124 can perform pollution and greenhouse gas emissions reduction reporting. The report can show the environmental impact of the property and quantify pollution and emission reduction measures and their corresponding emission reduction levels. Environmental footprint module 124 can communicate with report module 120 to allow user 308 to set a graphical and numerical display of the actual pollution reductions of the facility or property 200. User 308 can define a time period to view what the reduction levels are of that facility or property 200.

Reductions in pollution and emissions levels can be lowered in a variety of ways including but not limited to changing operations (i.e., embracing efficiency measures, replacing equipment, using different fuel sources), buying alternative energies that do not produce as much or any greenhouse gases (including but not limited to green energy, hydro-electricity, or nuclear energy), or by offsetting the facility's pollutions (buying Renewable Energy Certificates (RECs), giving money to environmental funds, planting trees, etc.).

Environmental footprint module 124 can run simulations, noting the costs of compliance, to lower pollution below compliance, and the benefits in the sale of pollution credits. Further, the environmental footprint module 124 can quantify the performance (i.e., pollution/emissions reductions) of various facilities, on the same property or within an owner's portfolio, relative to the specific emissions levels or pollution reductions set forth within a corporate strategy. Corporate global warming strategy compliance can be viewed on the portfolio, property, or individual facility level. User 308 can compare budgeted allotments of pollutions vs. actual pollution and define tolerance levels for % deviations from the levels set by a corporate strategy. Alert module 108 can send a notification when actual pollution and emission levels exceed the user defined tolerance levels or corporate strategy.

Environmental footprint module 124 can also track Emissions Credit Trading. Some industries have a specific need for separate reporting on specific greenhouse gases, like carbon dioxide. Environmental footprint module 124 can prepare reports about specific greenhouse gases like carbon dioxide with the intention of isolating specific gases in order to better define its impact. This can allow the user 308 to define a carbon allowance (user defines interval level—from hour to year) and can track carbon dioxide emissions relative to the allowance and the market for the credits.

Report module 120 can display graphically (by month and by pollutant) amounts of the specific pollutant and the specific pollutant reduction in tons of the specific pollutant, the equivalent number of trees being cut down, and/or the number of miles being driven. A carbon trading report can include showing total $CO_2$ used and total monthly carbon allowance to determine additional "tradable" $CO_2$ or if $CO_2$ credits were needed to be purchased (i.e., the property has gone over the permitted allowance).

Occupancy module 110 tracks the number of occupants at property 200 and compares the occupancy data to both the demand and consumption data. Occupancy module 110 can track and notify user 308 of peaks in energy consumption correlated to specific occupancy of property 200. Further, occupancy module 110 can track the occupancy of particular tenants 302 and the energy consumption of tenant 302 to determine if the space rented by the tenant 302 is being used for the purpose agreed upon between owner 300 and tenant 302. Additional, peak occupancy, resulting in a spike in energy usage can be tracked and automatically assigned to tenant 304. Also, an occupancy per energy curve can be normalized by square footage and can be used as a value to compare properties to each other as a measure of efficiency.

In an embodiment, occupancy module 110 is not aware of the identity of the particular occupants, just a "head count" of the occupants in property 200 at a particular time and date. An alternate embodiment is aware of the identity of the particular occupants and is also aware of their work location or office. Energy usage for a particular office can be tracked to see if occupants are powering down their lights and/or workstation while not on property 200.

A further embodiment combines occupant tracking with the environmental controls for property 200. Lights, heating and/or air conditioning can be controlled via occupancy data. If the system determines that certain occupants are not in property 200, energy usage can be curtailed and conserved. Once an occupant arrives at property 200, the environmental systems can return to a predetermined setting.

Additional embodiments can track the temperature of particular sections of property 200. A "sunny" side of property 200 has higher temperatures than a "shady" side of the property 200, and, during the summer, the sunny side requires more cooling than the shady side. Accordingly, the shady side requires more heating in the winter than the sunny side. The above factors, along with occupant data, can be considered when analyzing energy usage to determine when spikes in energy use occur.

Rate tracking module 112 can analyze the market rates for LDC 304, supplier 306 and other energy providers. Other providers include other green and brown providers as well as any power generated internally by property 200. Rate tracking module 112 can re-calculate the rate calculation performed by LDC 304 for each account class which can be used to compare the market rate to supply rates. Further, the market rates can be used to calculate a cost savings between the market rate and the lower supply rates. The re-calculation of the LDC rate calculation can assist in analyzing properties using suppliers 306 by comparing rates with properties using only LDC 304 to supply their energy. Also, the re-calculation can be compared to the actual bill from the LDC 304 and used to double check the LDC's calculations. If there is a deviation between the re-calculation and the LDC bill, an alert can be sent to user 308 that the LDC bill should be reviewed for errors. The alert can be sent through the alert module 108, described in detail below.

Rate tracking module 112 can compare supplier's 306 rate against the rates of comparable competing suppliers to determine if supplier 306 is competitive or of a change of suppliers is warranted. A comparison between LDC 304, supplier 306 and competing suppliers can be modeled over time to determine cost comparisons and the most cost effective supplier given the present and historical energy usage of property 200.

Further rate tracking can determine if the energy consumption of property 200 is outside the maximum consumption dictated in a supply contract between owner 300 and LDC/supplier 304/306. An alert can be generated by alert module 108 notifying user 308 to review the contract and possibly renegotiate the terms of the contract.

Energy tracking and reporting system 100 can also include an efficiency module 114 to calculate efficiency benchmarks. Efficiency benchmarks can be calculated by normalizing consumption to the square footage, occupancy or other property 200 metrics. The normalizing allows one property's energy use to be compared with another's. Each property 200 can have benchmarks calculated and used for comparison. Examples of efficiency benchmark comparisons are comparing property efficiency against a user-defined portfolio. User 308 can be a property manager of multiple properties and user 308 can compare a property to the rest of the properties in a portfolio, all properties visible to user 308, and EPA guidelines for efficiency. Additionally, each property 200 in central database 102 can be indexed and user 308 can compare efficiency benchmarks against the efficiency benchmarks of all properties of the same property class even if the properties are not normally visible to user 308.

Efficiency module 114 can also track property efficiency over time. Property efficiency metrics can be compared for different time periods in a range (i.e., 15 minutes, hourly, daily, weekly, monthly, billing period, seasonally, quarterly, or yearly). Efficiency benchmarks can be compared to changes in one or more of consumption, occupancy, and temperature. An alert can be generated by alert module 108 notifying user 308 that property efficiency has either increased (i.e., achieved a set goal for compliance) or decreased (property is less efficient).

Further, efficiency module 114 can use information regarding the submetered systems to compare the submetered usage to the tenant's lease provisions to see if a tenant is exceeding the provisions of the lease, if the owner is recouping his costs based on the rent charged, and the amount of power utilized by the tenant.

Budget module 116 can analyze the data stored on central database 102 and provide user 308 with multiple tables and charts analyzing all of the factors that tie into energy usage for property 200. Budget module 116 can perform many different analyses of current and historical data to estimate future energy usage and costs. Budget module 116, can, in one embodiment, generate footnotes to describe any assumptions used in budget creation. The footnotes can be automatically generated from the parameters used to define the budgets. Alternately, or in addition to, the footnotes may be entered by the user to provide additional information on the assumptions used in budget creation, and specifically to explain manually entered values (supply costs, efficiency factors, occupancy, etc.).

Figure 3:
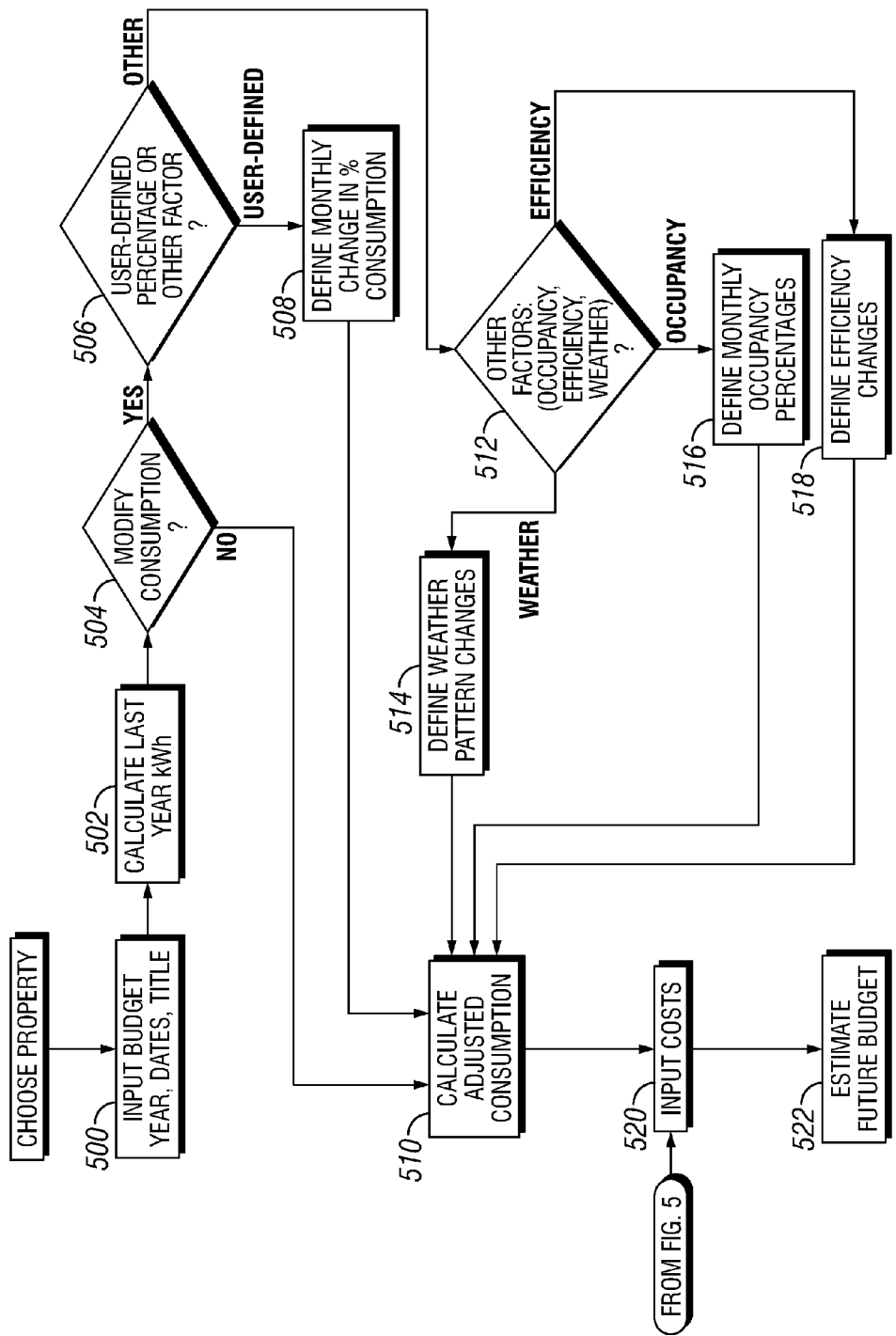
FIG. 3 is a flow chart of a method of the present invention.

FIG. 3 illustrates a method of determining a budget, based on historical data, for property 200. As part of the budget, future energy consumption can be calculated. User 308 selects a time period over which historical energy consumption data is used (step 500). Typically, one or more previous years are used as the time period. Alternately, a budget for a future month or season can be calculated by using the same month or season from previous years.

The historical energy consumption for the entire historical period is calculated (step 502) and user 308 is given the option to modify the historical consumption (step 504). If user 308 elects to modify the historical consumption, the data can be modified by a user defined factor or an alternate factor (step 506). If user 308 defines a factor (step 508) the historical consumption is modified by the factor to calculate future energy consumption (step 510). Alternately, user 308 can select other, calculated factors, including, for example, occupancy, efficiency or weather (step 512).

User 308 can then input the changes to the weather pattern (step 514). User 308 can increase or decrease the number of Cooling Degree Days and/or Heating Degree Days and the historical consumption is modified accordingly to calculate the future energy consumption (step 510).

Alternately or in addition to the weather modification factors, user 308 can input a change in occupancy of property 200 (step 516). The historical consumption is then modified by the occupancy factor to calculate the future consumption (step 510).

Further, user 308 can define a change in efficiency (step 518) and the future consumption is calculated from the historical consumption and the efficiency factor (step 510). The future cost of the energy is calculated and input into the model (step 520). The calculation of future costs is outlined below. Future consumption is multiplied by future costs for the time period and the total future budget is calculated (step 522).

Figure 5:
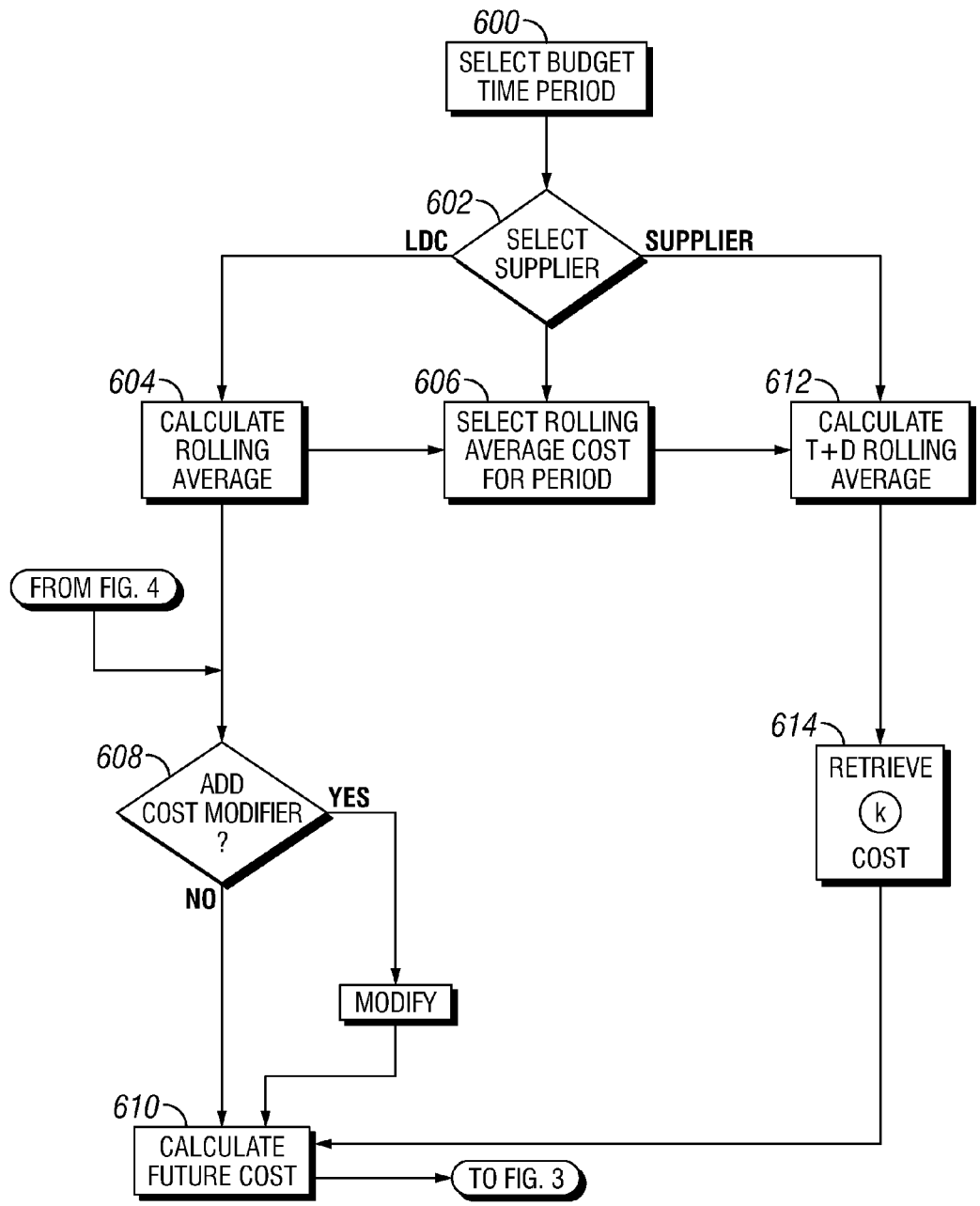
FIG. 5 is a flow chart of another embodiment of the present invention.

Another embodiment of the invention is a method to calculate a future cost basis to apply to the future consumption. FIG. 5 illustrates user 308 selecting a budget time period over which the rates should be forecast (step 600). User 308 selects if supplier 306 is supplying the energy or if LDC 304 is handling both transportation and delivery and energy supply (step 602). If LDC 304 is handling both the transportation and supply, a rolling average cost for the energy is calculated for each month, billing period, or any other time period of interest (step 606). The rolling average can be calculated over a predefined period, for example, 3 years, or user 308 can select the rolling average period (step 606). The rolling average method of calculation does not separate the transportation and distribution costs from the energy costs. User 308 can optionally add a cost modifier to indicate an estimated increase or decrease in the cost of the energy (step 608). If the modifier is not added, the rolling average becomes the future cost (step 610). Alternately, if a modifier is input, the rolling average is modified accordingly and the future cost per unit energy is calculated (step 610).

If supplier 306 is handling the energy supply and LDC 304 is handling only the transportation and delivery, a rolling average is calculated only of the LDC charges (step 612). As above, the rolling average can be calculated over a predefined period, for example, 3 years, or user 308 can select the rolling average period (step 606). The supply costs are contracted for and the contract value is stored in central database 102. The contract supply cost is retrieved (step 614) and is added to the rolling average to calculate future costs (step 610).

The calculated cost from step 610 is then and input into the model (step 520—see FIG. 3) and multiplied by future consumption for the time period and the total future budget is calculated (step 522).

Figure 4:
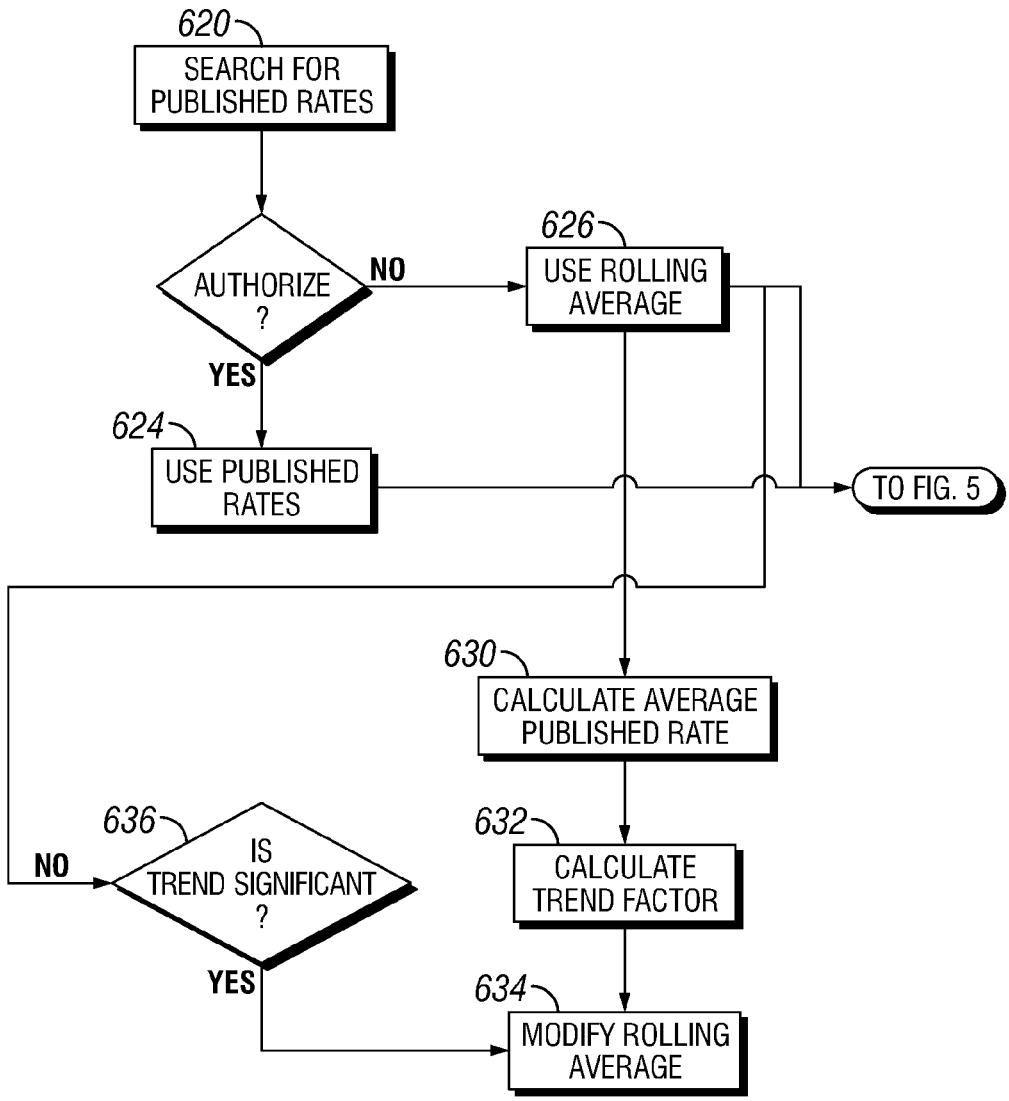
FIG. 4 is a flow chart of an alternate embodiment of the present invention.

Additional modifiers can be used for calculating the future costs. For LDC transportation and distribution costs and LDC supply costs, rate tariffs are published, typically six or twelve months in advance. The method illustrated in FIG. 4 can search for available tariff rates (step 620) and if published rates are available for any period of the selected budget period (step 622), the published rates are used for that period (step 624) or else the rolling average is used (step 626). Additionally, just the transportation and distribution published rates can be used for the LDC/supplier model.

If there is a period of time in the selected budget period where published rates are not available, the rolling average can be trended and modified accordingly. The trending method includes calculating the average of the published rates (step 630) and calculating a trend factor (step 632) by subtracting the calculated rolling average from average published rate. The trend factor then modifies the rolling average (step 634) for the periods of time where there are no published rates. Alternately, user 308 can set a threshold for the minimum trend factor used to modify the rolling average. If the trend factor is greater than or equal to the threshold, the rolling average is modified, if the trend factor is less than the threshold, the rolling average is not modified (step 636).

The above calculations can be performed for any energy source over any time period for any property or tenant. If historical data for a property is limited or not available (i.e., new construction), historical data from other properties can be used to fill in missing information or be used as a "best guess." The properties selected can be similar in location, use, occupancy, or any other factors user 308 chooses.

In an embodiment, calculations are performed separately for each LDC Account belonging to a property, if property 200 is supplied by multiple LDC Accounts. The characteristics of each LDC account may be different enough to warrant different budget parameters. Once calculated and stored, the budget data may be viewed and reported in aggregate for all combined LDC accounts serving a Property 200 and for a collection of those properties.

Example 1

Future Consumption

Below is a breakdown of the calculations and methods of budget module 116 for a budget for the next 12 months. The calculations to estimate future consumption for the budget period are based on historical consumption data. User 308 can use or not use any of the adjustments below. Note: (yB)= budget year; (yB−1)=the year previous to the budget year; and (yB−2)=two years previous to the budget year.

1. User 308 defines a 12-month budget period for an individual property or group of properties using some or all of the following parameters:
   a. Property 200.
   b. Budget period.
   c. Starting month and year of budget period, where the budget period defined as being the length of time defined by user 308 beginning at the start month/year entered by user 308.

2. Historical consumption data is retrieved from central database 102 for property 200:
   a. Monthly actual consumption data for each month of budget-year-minus-one (yB−1). (i.e. For a 2005 Budget covering January through December 2005, retrieve consumption data for January through December 2004)
  b. If a month (yB–1) is not available for a given month, retrieve month (yB–2) (e.g., if May, 2004 is not available, retrieve data for May, 2003).
  c. Optionally, user 308 can choose to extrapolate month's (yB–1) likely consumption from previous month's (yB–2) consumption:
    i. Sum consumption for months of yB–2 where Heating Degree Days are zero and divide by number of months in the user selected budget period to find mean non-heating monthly consumption for yB–2. Repeat the process for Cooling Degree Days.
    ii. Repeat the above calculations for the months of yB–1 to find mean non-degree days: non-heating degree days and non-cooling degree days monthly consumption for yB–1.
    iii. Calculate the factor by which consumption increased/decreased in yB–1 over yB–2=1+((non-heating(yB–1)–non-heating(yB–2))/non-heating (yB–2)). Repeat for cooling degree days.
    iv. Determine if likely month (yB–1) is a month that experiences heating or cooling degree days and multiply month (yB–2) by the appropriate heating/cooling factor to predict month (yB–1) likely consumption.
3. Retrieve the actual Heating/Cooling Degree Days (H/CDD) for each month of yB–1 (or yB–2) used for the base consumption value.
4. Retrieve the historical average Heating/Cooling Degree Days for each month from the database:
  a. For each month of the budget year, calculate the average sum of heating/cooling degree-days for the period defined by the start and end dates of the billing cycle in yB–1. Billing cycle "months" may differ from calendar months and the bill can be "dated" by which month the bill is received and paid. Calculations can be consistent with the billing cycle for ease of comparison. The calendar month of June will have a different amount of HDD and CDD as opposed to a billing month split between May and June (as below).
    i. Example: the month of "June" in yB–1 is from May 15, 2004 to Jun. 15, 2004.
    ii. Sum CDD for each year available between 5/15/xx and 6/15/xx.
    iii. Divide by number of years available to find the mean CDD total between May 15 and June 15.
5. Calculate and/or retrieve the heating/cooling factor for property 200 from central database 102 and modify historical consumption by the factor. The heating/cooling factor can be calculated based actual historical data for property 200 or can be based on the average of other similar properties and retrieved. The heating/cooling factor is, in one embodiment, calculated once a month as new heating and cooling degree day information becomes available.
  a. If daily consumption data is available, calculate, for example, the cooling factor (CF) (calculations can be repeated for the heating factor, using heating degree days):
    i. Plot daily consumption against cooling degree-days.
    ii. Determine the average slope increase in consumption per cooling degree day.
    iii. Divide the slope by property square footage.
  b. Determine, for example, the non-cooling baseline (y-intercept on the consumption vs. CDD chart) by calculating the average non-cooling energy usage for the previous 12 months. (Can perform similar calculations for the non-heating baseline).
    i. For example: Y-intercept (YI)=January(energy usage)+February(energy usage)+March(energy usage)+November(energy usage)+December(energy usage)/number of days/square feet. The y-intercept can be stored and updated when new energy usage data is available.
  c. The resulting cooling factor (CF) and Y-Intercept (YI) values may be used to calculate expected consumption for a property using the following formula:
    i. kWh=((CF*CDD)+(YI*Days In Month))*Sqft.
    ii. For example if CF=0.0006969; CDD=180; YI=0.0717038; a month containing 30 days and Sqft=600,000:
    ((0.0006969*180)+(0.0717038*30))*600,000=1,365,934 energy units.
  d. The above result can be further adjusted for the average Degree Days. The calculations are performed for both heating and cooling days. Additional accuracy can be achieved by adjusting the actual consumption data from the previous year (yB–1). An example calculation follows using: energy usage(yB–1)=1,200,000; CDD(yB–1)=160; historical average CDD=190; CF=0.0006969 and Square Footage=600,000
    i. Calculate the proportion of monthly consumption that corresponds to actual cooling degree days for that period:
      I. Actual energy(cooling)=CDD*CF*Sqft
        Actual Cooling=(160*600000*0.0006969)=66,902 energy units.
      II. Average energy(cooling)=AvgCDD*CF*Sqft.
        Average Cooling=(190*600000*0.0006969)=79,447 energy units.
      III. Delta(cooling)=Average energy(cooling)–Actual energy(cooling).
        Delta=(79,447–66,902)=12,545 energy units.
      IV. Adjustment for average cooling degree-days=consumption(yB–1)+Delta(cooling).
        Adjusted consumption=1,200,000±12,545=1,212,545 energy units
6. Modify historical consumption based on occupancy by determining the per-capita consumption and apply an estimated increase or decrease in consumption based on changes in occupancy.
  a. Property occupancy in number of persons for each period of the pre-budget year yB–1 is retrieved from central database 102. The historical daily occupancy data is used for the expected occupancy for the estimated budget year (yB). Alternately, user 308 enters occupancy data manually. Occupancy data can be in number of persons or in percentage of total possible occupancy for the tenant or property.
  b. Statistics for energy usage per capita for cooling and non-cooling months are calculated (a similar calculation is performed for heating and non-heating months):
    i. Energy-per-capita-non-cooling=sum(non cooling consumption(yB–1))/sum(non cooling occupancy (yB–1)).
    ii. Energy-per-capita-cooling=sum(cooling consumption(yB–1))/sum(cooling occupancy(yB–1)).
    iii. Occupancy adjustment is: Consumption(yB–1)+Energy-per-capita*(occupancy(yB)–occupancy(yB–1)). In this example, there are two energy per-capita factors, one for cooling months and one for non-cooling months (as above). The appropriate factor is chosen based on the particular month being budgeted, depending on whether cooling was applicable or not. For example, June through September can use the energy-per-capita cooling, and October through May can use the energy-per-capita non-cooling.

c. Building baseline consumption can also be determined if historical occupancy data is not available and user 308 does not or cannot estimate the occupancy. Two additional methods are available:

i. Calculate off-peak non-cooling (and non-heating) consumption (typically, nights, weekends, and holidays when the building is minimally occupied.)

ii. If property 200 is fully submetered for tenants 302, the base building consumption may be derived from a public light and power analysis. The public light and power requirements are from the portions of property 200 that are not tenant specific. It can be determined by subtracting the total of tenants' consumption, from the property total consumption.

7. Modify the historical consumption based on efficiency. User 308 applies a fixed monthly reduction in consumption caused by energy efficiency programs at property 200. The efficiency adjustment is typically applied after any or all of the other adjustments detailed above, and requires on simple subtraction from the monthly total expected consumption for each month of the budget year.

The corrections outlined above can be used for any energy source and over any heating or cooling period. Additionally, the modifiers based on weather, occupancy and efficiency can be applied independently or cumulatively, depending on the needs of user 308. Further, for a full year's budget, the calculations can be performed for all of the energy sources to calculate a total energy budget.

Future Costs

For a complete budget, future energy costs can be calculated along with future consumption. The method for calculating future costs per energy unit is below. The example describes the methods for calculating the budgeted cost per energy unit for a 12 month period.

1. Determine if LDC 304 is handling both transmission and distribution and supply or only transmission and distribution. If the latter, supplier 306 supplies the energy and a contract can state the cost for the energy for the term of the contract.

2. If LDC is supplying the energy, calculate a historical cost average.

a. For each month, calculate a rolling average cost per energy unit (for the example, a 3-year rolling average) by:

Average $/energy unit=(TotalCost(month($yB$−1))+ TotalCost(month($yB$−2))+TotalCost(month($yB$−2)))/(energy unit(month($yB$−1))+energy unit (month($yB$−2))+energy unit(month($yB$−3))).

3. Use published Utility rate tariffs to predict the cost per energy. Rate tariffs are published up to six or twelve months in advance. Thus, for the exemplary 12 month budget, some or all of a portion of the time period is covered by the published rates.

a. For the period of time where published rate tariff data is available, use the published rate.

b. Alternately, the published rate can be utilized as follows.

i. Maintain a database of projected transport and delivery rate changes, in percentages over time, by load factor range. The transport and delivery rate change database may be periodically updated as new information becomes available. In an embodiment, the changes to this database are not automatically be reflected in existing budgets, unless those budgets are deliberately re-calculated by the user. Alternately, the budgets can be automatically updated. The updated budget can be shown in "redline" form to indicate the changed factors. The database can include:

I. An Effective Date of the rate

II. A Load Factor Range (expressed as two numbers between 0 and 1); and

III. An Adjustment Value, expressed as a percentage change from the previously effective rates.

ii. Project future transport and delivery costs by applying the appropriate adjustments to the historical transport and delivery costs for the property as the adjustments become effective during the budget time period. The past rate adjustments are stored to determine whether any given historical transport and delivery cost data already included a rate increase or not. This determination can be performed for any given month and/or year.

c. For the period of time where published rate tariff data is not available, calculate the average increase or decrease of the available time periods over the rolling average, and apply that percentage increase or decrease to the rolling average for the time periods without rate tariffs. For example, a calculated increase/decrease factor of a 5% increase in rates over the first half of the budget year over the historical average is applied forward to the remaining time periods to adjust the cost per unit energy accordingly. The increase/decrease factor is used to indicate trends and to extend that trend forward for estimating purposes. The increase/decrease factor is calculated by:

increase/decrease factor=(average published rates− average historical rates)/average historical rates 4. Alternately, or in addition to Step 3 above, user 308 can define a fixed percentage increase or decrease that should be applied to the historical average cost per unit energy. User 308 provides this value based on general knowledge of expected changes in rates for the budget year, but in the absence of the specific utility rate model information. Anticipated transport and delivery rate changes can also estimated based on knowledge of market conditions, and pricing trends and inputted accordingly.

5. If supplier 306 is supplying the energy, calculate the transmission and distribution costs separate from the energy cost. Further, the supply cost can be calculated by several methods, depending on whether a supply contract will be in place during the budget period.

a. Calculate the historical average transmission and distribution cost per energy unit using the same steps as 2-4 above, but only use the transmission and distribution component of cost.

b. If a supply contract will be in place during the budget period then add contract supply rate including taxes to the transmission and distribution cost to obtain the total cost per unit energy. In one embodiment, this value can be locked so the user 308 cannot alter this value.

i. Fixed price supply contracts use a total cost per energy unit applied to the budgeted consumption for each month/time period.

ii. Block+Adder supply contracts have multiple components including at least Block, Adder, Overage, Block Size, and % Line Loss. Line Loss is the loss of energy incurred during transmission from the generation plant to the consumer expressed as a percentage. i.e., 5% line loss implies plant generates 105,000 kWh of electricity to provide a consumer with 100,000 kWh.

I. Block and adder supply contract costs are calculated as follows:
1. Block component= (BlockSize*24*days_in_period)*BlockPrice
2. Adder component=(Total Consumption*(1+% line loss)*Adder Price)
3. Overage component=(Total Consumption* (1+% line loss)− (BlockSize*24*days_in_period))*Locational Marginal Pricing (LMP) Hourly Pricing. A projected LMP Average Pricing can be stored in the database, by load factor range and date range.

iv. Index Supply Contract costs are calculated as follows:
I. Energy Component=(Total consumption*(1+% line loss)*Projected Average hourly pricing.
II. Adder Component=Total Consumption*(1+% line loss)*Adder pricing.

iv. Guaranteed Discount Contracts are calculated as follows:
I. Projected LDC supply cost−guaranteed discount.

c. For any months during the budget period where a supply contract is not in place, the supply price for those months can be edited by the user. The default supply price for the "uncontracted" months can be the projected market supply rate that is effective as of the first applicable month in the budget. The user can choose to modify any or all months' supply price and save this revised supply price as part of the budget configuration. Both future consumption and cost estimates can be improved with tracking and analyzing other intervals. Analyses can be performed for weekend vs. weekday usage and hourly vs. weekly vs. monthly usage. The above analyses can be used by owner 300 to shift the time of certain operations or attempt to reduce peak occupancy to gain savings. Further tracking can be performed at the tenant, meter, and sub-meter level. Thus, tracking can be performed for sections of property to receive better resolution on for the analysis.

Energy tracking and reporting system 100 can also include alert module 108. Alert module 108 is programmed with baseline values and standard deviations. Alert module 108 can monitor some or all of the incoming data entered into central database 108 and compare the incoming data to the baseline values. If there is a difference between the incoming data and the baseline values that is within the standard deviation, no alert action is taken. If the difference is greater than the standard deviation, an alert action is taken. The alert action can be one or all of the following:

Creating an alert record in one of the central database 102 on an alert database 118. The record can include information about property 200, the alert condition, the date-time stamp, the billing period to which the alert applies, and the severity.

Communicating an alert notice to one or more of user 308, owner 300, and tenant 302. The alert notice can be an e-mail, page, or automated telephone call. Alert notices sent to a web enabled device (computer, pager, cell phone, PDA, etc.) can include a hyperlink to either central database 102 or alert database 118 to provide access to the alert record or other additional information about the alert condition. For a non web enabled device, a text to voice system can be enabled to "read" the additional information to user 308 upon request. For example, if the alert notice is a telephone call, a voice menu system can prompt user 308 through a series of menus to retrieve the information regarding the alert condition. For a pager, a telephone number (toll free or otherwise) can be provided for user 308 to dial in and enter the voice menu system to retrieve the information.

Additionally, the alert notice can be communicated to a system manager 310 who can review the alert record for accuracy before the alert notice is transmitted to user 308. Further, the alert notice can contain information regarding system manager 310 and user 308 can communicate with system manager 310 directly for information regarding the alert notice.

Alert module 118 can track numerous alert conditions, in both energy usage for property 200 and in the general energy market. Energy tracking alerts are triggered by changes in consumption, peak demand, cost, and contract savings.

Changes in consumption, demand and cost are compared to changes in cooling/heating degree days. A corresponding increase or decrease in the consumption, demand and cost and the degree days can trigger an alert and the correspondence in the values is used as an explanation for the increase or decrease. However, a divergence between the values triggers an alert notice for system manager 310 to investigate the conditions. The changes in values can be compared to any equivalent time period, for example, the equivalent month of the previous year, or to the previous month.

For properties where a supply contract is in effect, the actual cost of supply is compared to the cost of supply if a contract was not in place. The supply cost is compared to the rate model for LDC 304 and the deviation is determined. The alert notice notifies user 308 of the savings or loss experienced under the contract as compared to what would have been paid to LDC 304.

For market alerts, the gas and oil reserve markets, competitive supply prices, and the tariff rates for the LDC are monitored by energy tracking and reporting system 100 and current pricing information is tracked. The tracking can be performed by geographic market and the specific energy market. Alert notices are generated when market prices change and would offer a cost savings to user 308. Additionally, general informational alerts can be sent to users based on changes in market conditions even if they do not directly affect the user's costs. If a supply contract is not in place, the market rate is compared to the LDC supply rate found in the rate model. If a supply contract is in place, the market rate is compared to the supply contract rate. The annual cost savings over the current supply price are calculated and included in the alert notice. The tracking is performed, in one embodiment, daily, but can be any time period.

Further, if a supply contract is in place, the charges for terminating the supply contract are factored in to the alert notice. A further option is "blend and extend" where the price of the existing contract may be adjusted downward in return for extending the supply contract.

Additional alerts can be generated if the redistribution revenues drop below a predefined value. This is an indicator that owner 300 is not recovering this expenses in redistributing the energy to tenants 302.

Figure 6A:
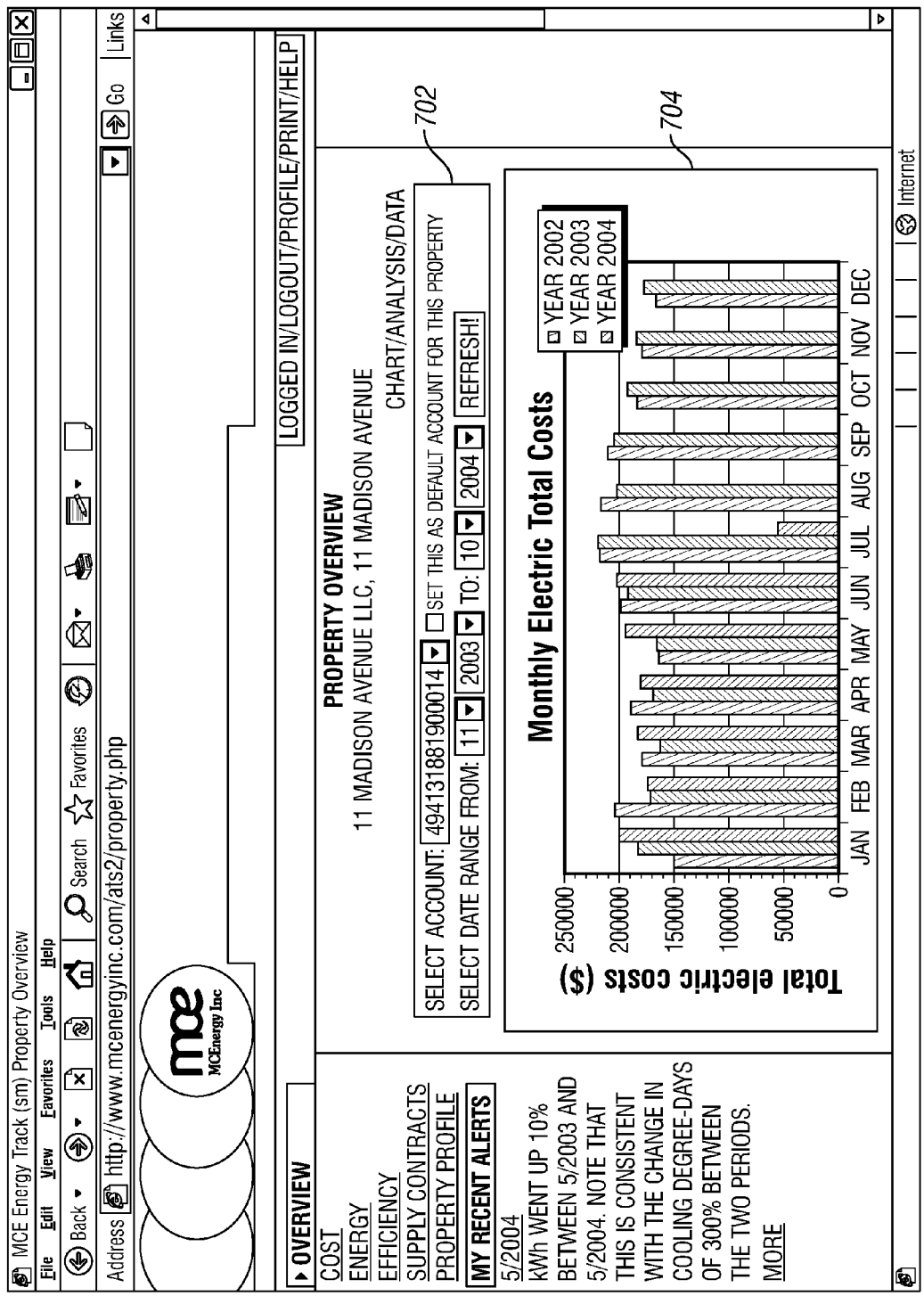
Figure 6B:
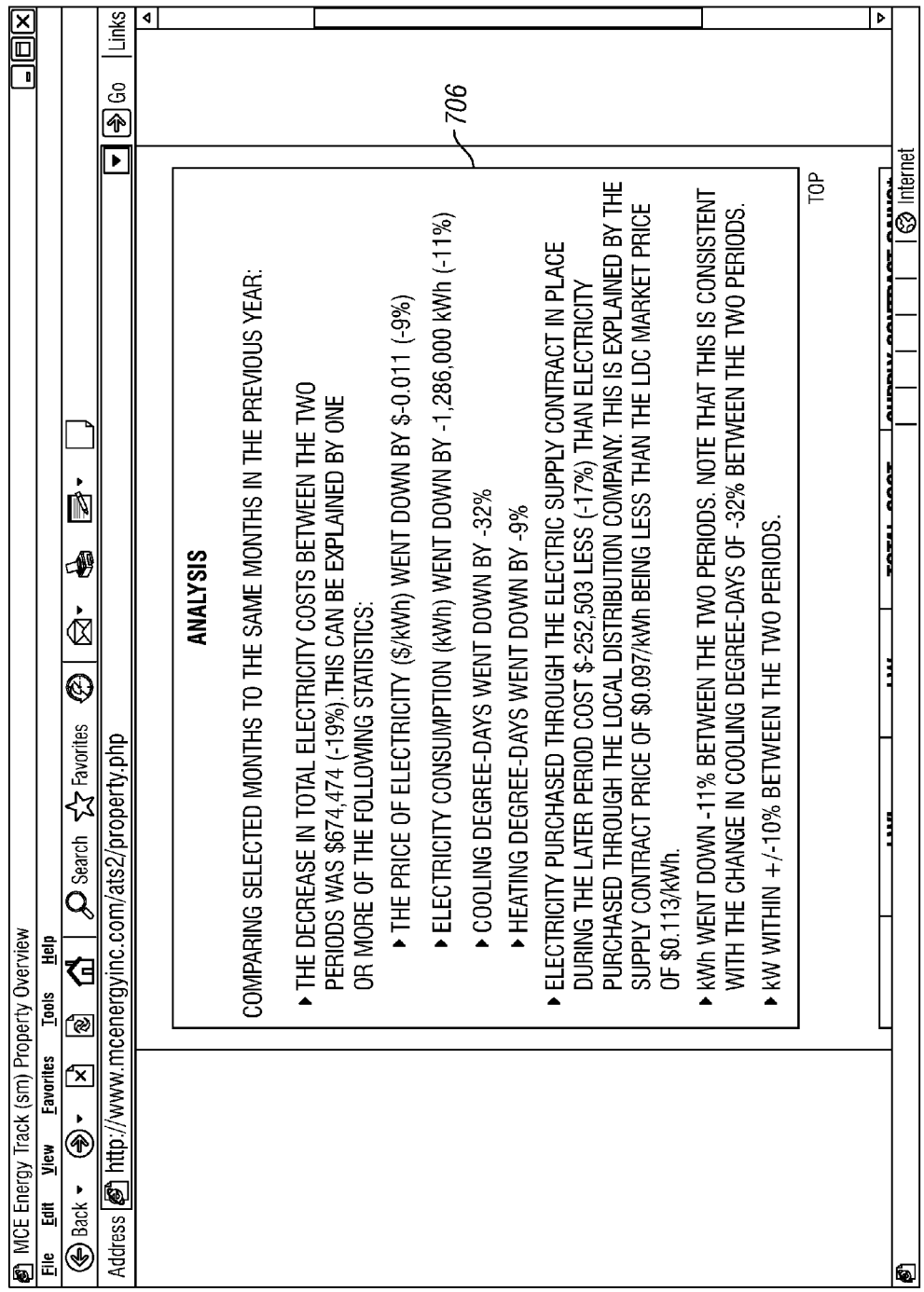
Figure 7:
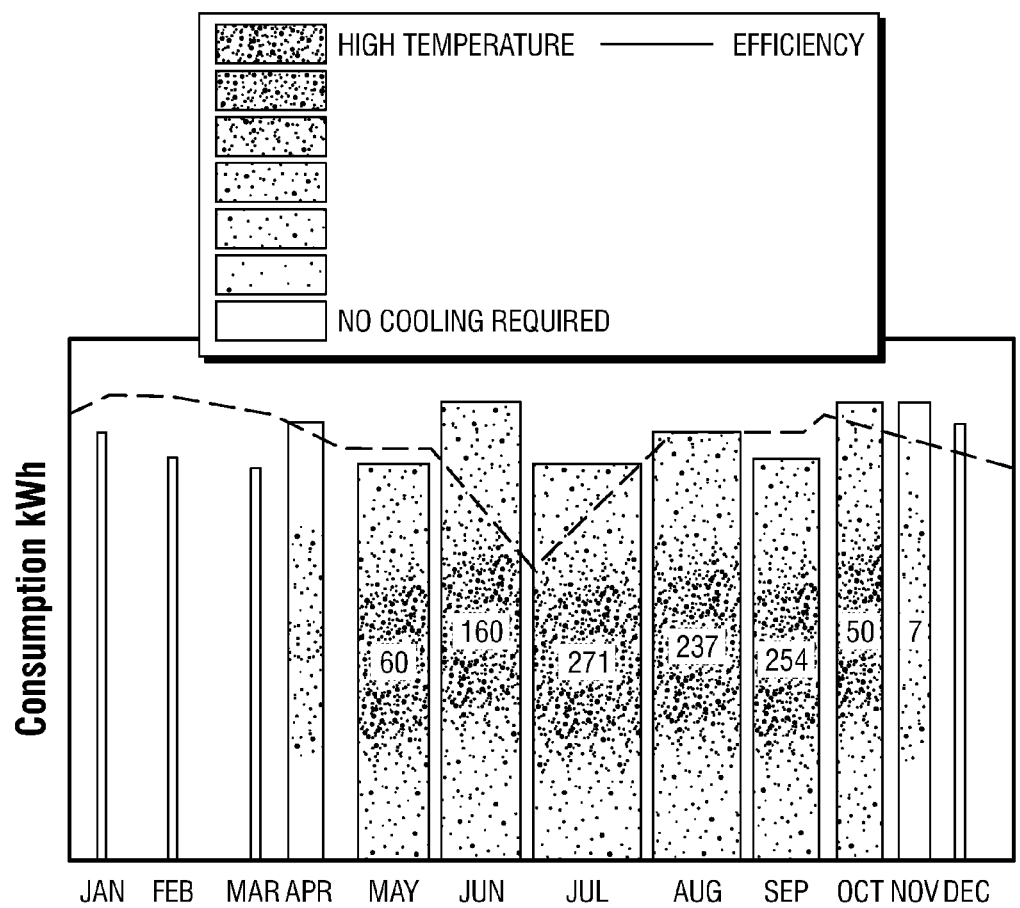
FIG. 7 is an illustration of an efficiency chart of the present invention.

User 308 can interface with central database 102 using report module 120. Report module 120 allows user 308 to select certain data and graphical outputs to display the information gathered, calculated and stored in central database 102. FIGS. 6a, 6b, 6c and 7 display a typical output from report module 120. FIGS. 6a, 6b and 6c illustrates a property overview chart 700 for electrical usage for property 200. Input line 702 allows user 308 to select property 200 and the date range over which data is displayed. The monthly (weekly, hourly) energy costs can be displayed for the selected time range in chart section 704. FIGS. 6a, 6b and 6c illustrate electrical usage for years 2002-2004 for the entire year. Chart section 704 is illustrated as a bar chart but can be any type of display including a line chart. Analysis section 706 displays a detailed analysis of the trends displayed in chart section 704 and a summary description suggesting reason for the trend. For example, analysis section 706 reports a decrease in electrical costs and outlines a number of reasons for the decrease, including a decrease in energy costs, consumption and weather factors. Raw data section 708 displays the data used in chart section 704 and analyzed for results displayed in analysis section 706. Displaying the raw data allows user 308 to look closer as to where the changes occurred and to perform additional analysis if necessary.

System 100 can also include a trending module 122. Trending module 122 can use fuzzy logic or basic artificial intelligence to modify parameters and make "guesses" as to energy consumption, cost and market trends by analyzing historical data for all the properties in central database 102. Trending module 122 can identify historical trends beyond the requested date range and can adjust the calculated future consumption and cost numbers to fit a determined long term trend as opposed to the short term trend determined by the above calculations.

Energy tracking and reporting system 100 can preferable be divided into two separate databases, a storage database 130 and a user database 132. Storage database 130 and user database 132 are typically connected over a network. Storage database 130 performs most of the data storage and calculation tasks performed by central database 102. Storage database 130 is typically managed by system manager 310 and user 308 cannot access it. User database 132 contains information for only the properties accessible to user 308. The information is typically only a subset of the information stored in storage database 130 and is the information most likely needed by user 308 to perform budgeting and analysis functions. User database 132 is periodically or continuously updated to contain current information. Alternately, user database 132 is updated as user 308 logs into system 100. User database 132 can perform the remaining functions of central database 102 or some functions can overlap as necessary.

Storage database 130 and user database 132 can be divided to allow for security so user 308 cannot "hack" into properties user 308 cannot normally access. Further, user database 132 contains much less information and thus storage space is reduced and system speed is accordingly increased.

Further, the databases 102, 130, 132 can be populated manually or automatically by downloads from other databases controlled by third parties. Additionally, in one embodiment, "spiders" or agents can be sent out to the Internet to retrieve information. Databases 102, 130, 132 can include multiple storage locations, storing portions of the data. Further embodiments can include references to the necessary data combined with contemporaneous gathering of data to perform any of the above calculations or analysis. Databases 102, 130, 132 can be mirrored over numerous servers or be "regionalized" depending on the location of the server, to contain primarily data related to properties located in the region serviced by the particular server.

All the embodiments described above can include any or all of the data or information being input into the databases 102, 130, 132 manually or receiving the information via a network (e.g., LAN, WAN, Internet, etc.). Modules 106-116, and 124 can receive their required information from the central database 102 or store the information in the module. Tenants 302 can be allowed access to their specific account, especially if the property 200 is submetered.

We claim:

1. A method of calculating future energy consumption for a property comprising the steps of:
   a) receiving, at a server, over a network, from a user computer, a selection of a first time period;
   b) receiving, at the server, over the network, from the user computer, a selection of a starting time for the first time period;
   c) retrieving, from a database connected to the server, historical energy consumption data for the property for a plurality of subdivisions of the first time period, wherein the historical consumption data for the first time period comprises data for one or more subdivisions of a first previous year, wherein the first previous year is one year previous to the first time period;
   d) performing by a processor the steps of:
      i) calculating an average sum of at least one of heating degree days and cooling degree days for each of the plurality of subdivisions of the first time period using the historical consumption data;
      ii) calculating at least one of a heating factor and a cooling factor for the property using the historical consumption data by:
         (1) determining a rate of increase in energy consumption per at least one of the heating and the cooling degree days; and
         (2) dividing the rate of increase by a square footage corresponding to the property;
      iii) modifying the historical consumption data by multiplying the historical consumption data for each of the plurality of subdivisions of the first previous year by at least one of the heating factor and the cooling factor;
      iv) modifying the historical consumption data by a per-capita consumption by determining a per-capita consumption rate based on a first occupancy amount and multiplying the determined consumption rate by an estimated increase or decrease in the first occupancy amount; and
      v) modifying the historical consumption data by subtracting an amount of reduced consumption due to actions at the property, wherein the resulting amount provides an estimate of future energy consumption for the property;
   e) when historical consumption data for one or more subdivisions of the first previous year is unavailable, retrieving historical consumption data, from the database, from one or more of a plurality of subdivisions of a second previous year, wherein the second previous year is more than one year prior to said first time period, and performing by a processor the steps of:
      i) extrapolating a target historical consumption data for one or more target subdivisions of the first previous year for which consumption data is unavailable from the historical consumption data of the second previous year, comprising the steps of:
         (1) summing an energy consumption for the subdivisions of the second previous year wherein at least one of heating degree days and cooling degree days equal zero;
         (2) dividing by the number of selected subdivisions in the first time period to find at least one of a non-heating consumption and a non-cooling mean subdivision consumption;

(3) summing an energy consumption for subdivisions of the first previous year wherein at least one of heating degree days and cooling degree days equal zero;
(4) dividing by the number of selected subdivisions in the first time period to find at least one of a non-heating consumption and a non-cooling mean subdivision consumption; and
(5) calculating one of a heating consumption factor and a cooling consumption factor by applying the following formula: 1+(((one of a non-heating subdivision consumption and a non-cooling subdivision consumption, first previous year)−(one of non-heating subdivision consumption and non-cooling subdivision consumption, second previous year))/ one of non-heating subdivision consumption and non-cooling subdivision consumption, second previous year) to obtain a heating consumption factor and a cooling consumption factor;
ii) determining if the one or more target subdivisions experiences at least one of heating degree days and cooling degree days; and
iii) modifying the one or more target subdivision historical consumption data by multiplying the one or more target subdivisions' historical consumption data by at least one of the heating consumption factor and the cooling consumption factor.

2. The method of claim 1, wherein the calculating at least one of the heating factor and the cooling factor for the property comprises performing by a processor the further steps of:
a) determining at least one of a non-heating baseline and a non-cooling baseline by calculating at least one of an average non-heating energy usage and a non-cooling energy usage for the first previous year;
b) calculating an expected energy consumption from at least one of the heating factor and the non-heating baseline and the cooling factor and the non-cooling baseline; and
c) modifying the expected energy consumption by at least one of an average heating degree days and average cooling degree days.

3. The method of claim 1, wherein the modifying the historical consumption by the per-capita consumption step comprises the processor performing by a processor the steps of:
a) retrieving historical occupancy data for the first previous year;
b) calculating at least one of energy-per-capita non-heating and energy-per-capita non-cooling using historical energy data and the historical occupancy data;
c) calculating at least one of energy-per-capita heating and energy-per-capita cooling using historical energy data and the historical occupancy data;
d) determining a difference between a current occupancy and an occupancy the first previous year; and
e) modifying historical consumption by multiplying the difference by at least one of energy-per-capita non-heating, energy-per-capita non-cooling, energy-per-capita heating, and energy-per-capita cooling.

4. The method of claim 1, wherein the modifying the historical consumption by the per-capita consumption step comprises the step of calculating, by the processor, a property baseline consumption by at least one of calculating at least one of off-peak non-cooling consumption and off-peak non-heating consumption and performing a public light and power analysis.

5. The method of claim 1, further comprising forecasting the future environmental footprint by performing the steps of:
a) collecting, in the database, at least one of historical energy usage and historical emission sources;
b) converting, by the processor, the historical energy usage, historical emission sources and the common pollution levels into a common pollutant unit;
c) storing, in the database, historical emissions based on the common pollutant unit for the property;
d) tracking, in the database, current emissions based on current energy usage and emission sources for the property;
e) calculating, by the processor, an environmental footprint based on the historical and current emissions;
f) comparing, by the processor, the environmental footprint to at least one environmental baseline; and
g) forecasting, by the processor, the future environmental footprint based on the historical and current emissions.

6. The method of claim 5, further comprising calculating a future cost, a future consumption, or a future emission, by performing the steps of:
a) inputting and tracking emission guidelines in a database;
b) determining, by the processor, from the comparing step and in comparison with the emission guidelines, if the property is at least generating at least one of an emissions credit or expending the at least one emissions credit;
c) tracking and documenting the generating and expending of the at least one emissions credit; and
d) calculating at least one of a future cost, a future consumption, and a future emission based on the tracking and documenting step.

7. The method of claim 1, further comprising calculating a future cost, a future consumption, or a future emission, by performing the steps of:
a) inputting and tracking emission guidelines in a database;
b) determining, by the processor, from the comparing step and in comparison with the emission guidelines, if the property is at least generating at least one of an emissions credit or expending the at least one emissions credit;
c) tracking and documenting the generating and expending of the at least one emissions credit; and
d) calculating at least one of a future cost, a future consumption, and a future emission based on the tracking and documenting step.

8. The method of claim 5, wherein the energy usage includes the use of at least one of natural gas, heating oil, crude oil, steam, electricity, wind, solar, methane, hydropower, and nuclear.

9. The method of claim 5, wherein the historical energy usage, historical emission sources, energy usage, and emission sources are based at least in part on individual employee activities and owner purchases.

10. The method of claim 5 further comprising the steps of:
a) collecting, in the database, historical information regarding any pollution credits corresponding to the property; and
b) determining, based at least in part on the historical information regarding pollution credits corresponding to the property, an estimate of pollution credits for the property for a selected time period.

11. The method of claim 1 further comprising the steps of:
a) collecting, in the database, historical information regarding the relative amount of green energy used for the property;
b) comparing the amount of green energy used for the property to a predetermined amount; and c) providing an alert if the amount of green energy used for the property is below the predetermined amount.

12. The method of claim 1 further comprising the steps of:
a) collecting, in the database, historical information regarding gas emission levels for the property;
b) comparing at least one gas emission level for the property to a preselected number;
c) determining, based on said comparing step, whether the at least one gas emission level for the property exceeds a preselected number.

13. The method of claim 1 wherein at least one of said plurality of subdivisions comprises a month.

14. The method of claim 13 wherein the starting time for the first time period comprises a starting month and starting year.

15. The method of claim 13 wherein the historical consumption data for one of the first previous year's subdivisions comprises data for the month in the year immediately preceding an initial year included in the first time period.

* * * * *